United States Patent
Yun

(10) Patent No.: US 7,188,276 B2
(45) Date of Patent: Mar. 6, 2007

(54) APPARATUS AND METHOD FOR TESTING A COMPUTER SYSTEM BY UTILIZING FPGA AND PROGRAMMABLE MEMORY MODULE

(75) Inventor: Young-Sik Yun, Kyunggi-do (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 614 days.

(21) Appl. No.: 10/359,729

(22) Filed: Feb. 6, 2003

(65) Prior Publication Data
US 2003/0233207 A1 Dec. 18, 2003

(30) Foreign Application Priority Data
Jun. 17, 2002 (KR) .............................. 2002-33636

(51) Int. Cl.
G06F 11/00 (2006.01)
(52) U.S. Cl. .............................. 714/28; 714/30; 703/21
(58) Field of Classification Search .................. 714/44, 714/30, 28; 326/41, 39; 703/21
See application file for complete search history.

(56) References Cited

U.S. PATENT DOCUMENTS

| | | | |
|---|---|---|---|
| 4,639,916 A | | 1/1987 | Boutterin et al. |
| 5,825,202 A | * | 10/1998 | Tavana et al. .................. 326/39 |
| 6,057,708 A | * | 5/2000 | New ............................ 326/41 |
| 6,542,844 B1 | * | 4/2003 | Hanna ......................... 702/120 |
| 6,681,354 B2 | * | 1/2004 | Gupta .......................... 714/725 |
| 6,775,698 B1 | * | 8/2004 | Simone ....................... 709/221 |
| 6,839,874 B1 | * | 1/2005 | Fang ........................... 714/738 |
| 6,842,865 B2 | * | 1/2005 | Nee et al. ...................... 714/28 |
| 2002/0104051 A1 | | 8/2002 | Gupta |
| 2002/0194355 A1 | * | 12/2002 | Morita et al. ................ 709/231 |
| 2003/0023912 A1 | * | 1/2003 | Lesea .......................... 714/726 |
| 2003/0028826 A1 | * | 2/2003 | Balluff ........................ 714/44 |
| 2005/0132022 A1 | * | 6/2005 | Azagury et al. ............. 709/218 |

* cited by examiner

Primary Examiner—Scott Baderman
Assistant Examiner—Joshua Lohn
(74) Attorney, Agent, or Firm—F. Chau & Assoc., LLC

(57) ABSTRACT

An apparatus and method for testing a computer system by utilizing a Field Programmable Gate Array (FPGA) and programmable memory modules is provided. The apparatus includes a controller, a plurality of programmable memory modules, and an FPGA. Each programmable memory module stores configuration data of peripheral devices of the computer system in corresponding versions, respectively, which are differentiated according to functions of the computer system. Each memory module stores configuration data about a PCI host controller, a memory controller, a PLL, an interrupt controller, an arbiter, a UART, or a timer. The FPGA is programmed according to data stored in one memory module selected from among the programmable memory modules. Therefore, in the apparatus, the FPGA does not contain a bus bridge circuit, so that the FPGA has an increased programmable area and can be easily connected even with peripheral devices requiring many input and output ports.

16 Claims, 5 Drawing Sheets even if the functions of the computer system are changed, the apparatus can cope with such a change by selecting a memory module storing configuration data of peripheral devices corresponding to the changed functions and programming the FPGA according to the data stored in the memory module.

APPARATUS AND METHOD FOR TESTING A COMPUTER SYSTEM BY UTILIZING FPGA AND PROGRAMMABLE MEMORY MODULE

This application claims priority to Korean Patent Application No. 2002-33636, filed on Jun. 17, 2002, the contents of which are herein incorporated by reference in their entirety.

FIELD OF THE INVENTION

The present invention generally relates to a computer system test and, more specifically, to an apparatus and method for testing a computer system by utilizing a Field Programmable Gate Array (FPGA) and programmable memory modules.

BACKGROUND OF THE INVENTION

Nowadays, development of technologies for computer systems has enabled various peripheral devices to be connected with an existing computer system, so as to meet users' requirements. For example, a computer system may be equipped with embedded or external peripheral devices, so as to store or access data. As such peripheral devices described above, there may be enumerated embedded, internal or external hard drives, compact disc (CD) players, digital video disc (DVD) players, compact disc-recordables (CD-Rs), etc.

In order to enable such peripheral devices as described above to be connected with each other; a computer system generally employs a motherboard in which at least one Integrated Drive Electronics (IDE) connector and at least one Peripheral Component Interconnect (PCI) connector are embedded. The IDE connector is utilized mainly in connecting embedded or internal devices such as hard drives and CD-ROM drives. A host adaptor card is inserted in the PCI connector and used in connecting either embedded, internal or external devices.

In the process of developing a computer system as described above, there is required a test for confirming connections between the computer system and peripheral devices and operations of the connected peripheral devices. As one step of such a test, there exists a PCI host controller test. The PCI host controller participates in data communication between a system bus in the computer system and a PCI bus connected with peripheral devices. This data communication signifies communication which determines whether a system bus is in use or not and allows the system bus to be used in response to request signals from peripheral devices requiring use of the system bus. In order to perform the PCI controller test, information about functions of the peripheral devices must be stored in advance. Usually, the information is programmed and stored in a Field Programmable Gate Array (FPGA).

U.S. Pat. No. 6,057,708 (the '708 patent) discloses technology for programming information of peripheral devices in an FPGA in order to emulate a computer system. The '708 patent discloses an FPGA which includes a bus bridge circuit, a programmable logic array, a dedicated internal bus, and a plurality of dedicated bus interface circuits. The FPGA is coupled to an external bus through the bus bridge circuit, and the dedicated bus interface circuits are connected with the dedicated internal bus. The programmable logic array includes an array of configurable logic blocks (CLBs) and programmable interconnect circuitry. The configurable logic blocks are connected with the dedicated bus interface circuits through the programmable interconnect circuitry, respectively.

However, in the '708 patent, several input and output pins of the FPGA are used in connecting the bus bridge circuit with the external bus, so that the number of available pins is reduced. As a result, it may be impossible to connect some peripheral devices requiring many input and output ports with the FPGA. Further, in the '708 patent, since the FPGA contains a bus bridge circuit, the programmable area is reduced by the amount corresponding to the blocks taken by the bus bridge circuit.

SUMMARY OF THE INVENTION

A computer system-testing apparatus and method for testing a computer system without employing a bus bridge circuit is provided.

According to an aspect of the present invention, there is provided an apparatus for testing a computer system, comprising: a controller having a function of testing the computer system; a plurality of programmable memory modules, each of which stores configuration data of peripheral devices of the computer system; and a Field Programmable Gate Array (FPGA) programmed according to data stored in one memory module selected from among the plurality of programmable memory modules. The memory modules store the configuration data of the peripheral devices in corresponding versions, respectively, the versions being differentiated according to functions of the computer system. Each of the memory modules stores configuration data about a PCI host controller, a memory controller, a PLL, an interrupt controller, an arbiter, a UART, or a timer.

The apparatus for testing a computer system may further comprise a memory module control section for selecting one memory module from among the plurality of programmable memory modules. The apparatus for testing a computer system may further comprise a slot in which a function card connected with the peripheral devices, such as an audio adaptor card, a graphic adaptor card, a Local Area Network (LAN) interface card, a Small Computer System Interface (SCSI) card, or a PCI-ISA expansion card, is inserted. The apparatus for testing a computer system may further comprise a memory interface card with which a memory used in performing functions of the computer system, such as a system memory, a buffer memory, a cache memory, or a graphic memory, is connected.

According to another aspect of the present invention, there is provided a method for testing a computer system by means of an apparatus comprising a plurality of programmable memory modules and an FPGA, each of the programmable memory modules storing configuration data of the computer system in different versions, the FPGA being programmed according to data stored in one memory module selected from among the plurality programmable memory modules, the method comprising the steps of: downloading a predetermined test program; executing the test program; initializing PCI-related peripheral devices connected to the computer system; selecting a test item from a PCI test menu of the test program; and executing a test of the computer system in relation to the test item.

Therefore, in an apparatus for testing a computer system according to an embodiment of the present invention, the FPGA does not contain a bus bridge circuit, so that the FPGA has an increased programmable area and can be easily connected even with peripheral devices requiring many input and output ports. Moreover, since the apparatus for testing a computer system according to the present invention includes a plurality of EPROM modules storing configuration data of peripheral devices in different versions, manual accessing labor for replacing an EPROM module is unnecessary, and thereby time required in testing the computer system can be reduced.

The present invention will be better understood from the following detailed description of exemplary embodiments thereof taken in conjunction with the accompanying drawings, and its scope will be pointed out in the appended claims.

BRIEF DESCRIPTION OF THE DRAWINGS

The forgoing and other aspects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

It should be understood that the description of the preferred embodiments is merely illustrative and that it should not be taken in a limiting sense. In the following detailed description, several specific details are set forth to provide a thorough understanding of the present invention. It will be obvious, however, to one skilled in the art that the present invention may be practiced without these specific details.

Now, practical embodiments of the present invention will be explained in conjunction with the drawings.

Hereinafter, a computer system-testing apparatus including EPROM modules which are one type of programmable memory modules will be described. However, an EPROM module in the computer system-testing apparatus is only taken as an example in the following description. Therefore, it goes without saying that the idea of the present invention is not limited to the EPROM module.

Figure 1:
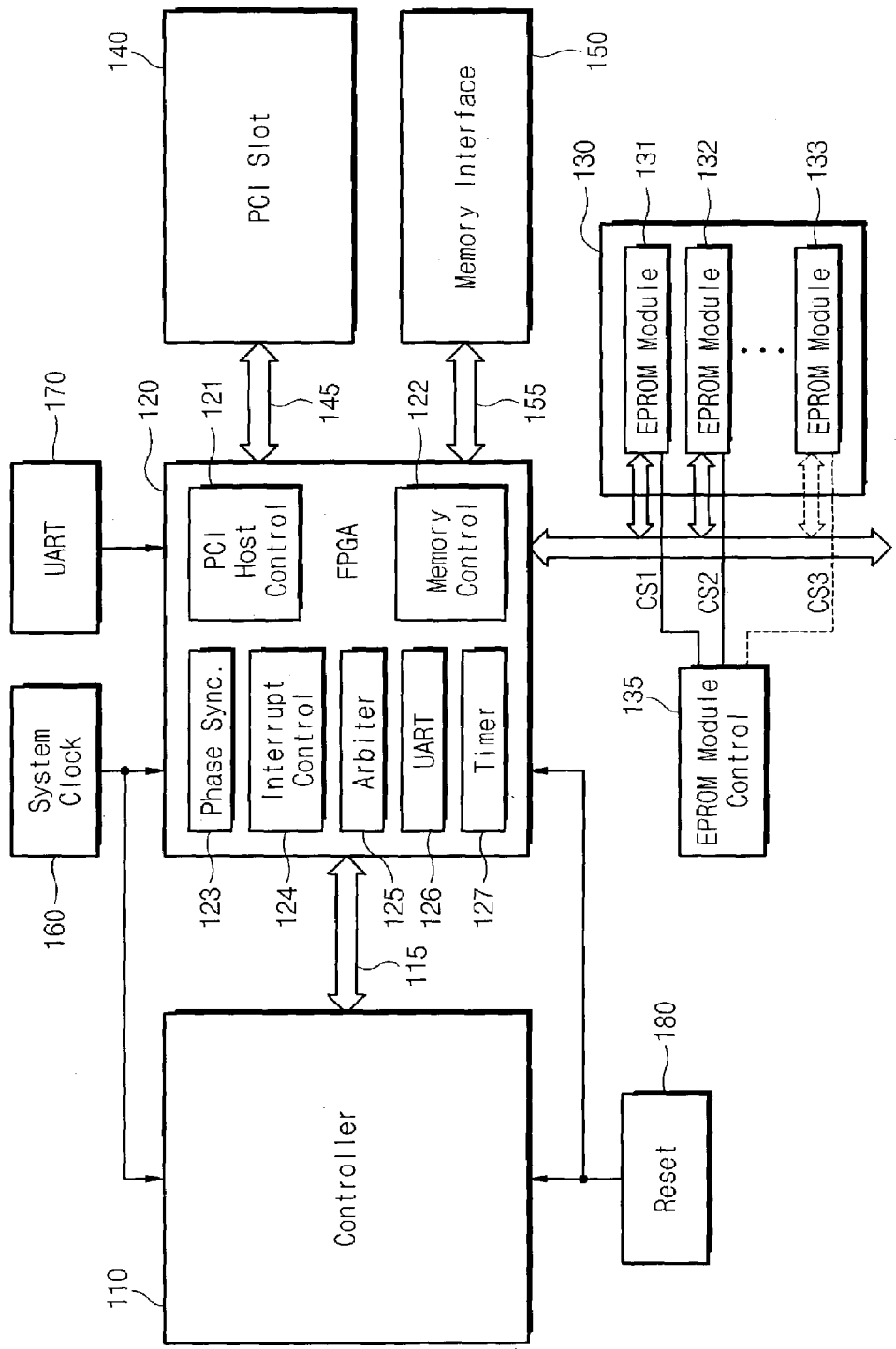
FIG. 1 is a block diagram of an apparatus for testing a computer system according to an embodiment of the present invention.

FIG. 1 is a block diagram of an apparatus for testing a computer system according to an embodiment of the present invention. Referring to FIG. 1, the computer system-testing apparatus includes a controller 110, an FPGA 120, a system bus 115, an EPROM module section 130, an EPROM module control section 135, a PCI slot 140, a PCI bus 145, a memory interface card 150, a system clock circuit 160, a first Universal Asynchronous Receiver/Transmitter (UART) section 170, and a reset circuit 180. The controller 110 contains a CPU core block which performs an operation function of a computer system, and a test core block which participates in testing of the computer system.

The FPGA 120 is programmed on the basis of data stored in one Erasable Programmable Read Only Memory (EPROM) selected from the EPROM module section 130 which will be described later. EPROM stores programs used in controlling functions of computer peripheral devices, and the FPGA 120 is realized in accordance with configurations of the computer peripheral devices. The FPGA 120 is programmed on the basis of information data of a PCI host controller 121, a memory controller 122, a Phase Lock Loop (PLL) 123, an interrupt controller 124, an arbiter 125, a second Universal Asynchronous Receiver/Transmitter (UART) 126, and a timer 127. The PCI host controller 121 enables data transmission between the controller 110 and the peripheral devices connected to the PCI slot 140. The memory controller 122 enables data transmission between the controller 110 and memory chips connected to the memory interface card 150.

The PLL 123 synchronizes clock signals used in the computer system with each other, thereby synchronizing operations of elements of the computer system. The interrupt controller 124 controls interrupts generated by the controller 110 and the peripheral devices connected to the PCI slot 140. The arbiter 125 mediates requests from the peripheral devices, which require use of the system bus 115, and grants a priority of using the system bus 115 to the controller 110 or the peripheral devices. The second UART 126 controls data transmission between the controller 110 and a communication device connected to the first UART section 170 such as a modem. The timer 127 adjusts the time set in the computer system.

The EPROM module section 130 includes a plurality of EPROM modules 131, 132, and 133. The information data about the above-mentioned elements of the FPGA 120, such as the PCI host controller 121, the memory controller 122, the PLL 123, the interrupt controller 124, the arbiter 125, the second UART 126, and the timer 127, are coded and stored in EPROM contained in each of the EPROM modules 131, 132, and 133. These coded data are contained in a file for performing the functions of the peripheral devices of the computer, which is a binary file called "image".

The EPROM modules 131, 132, and 133 store the configuration data of the peripheral devices in different versions, respectively. As a result, when functions of the peripheral devices are adjusted or extended, manual accessing labor for replacing an EPROM module is unnecessary, so that time required in testing a computer system can be reduced. Further, a sensitive part of a board of the computer system is prevented from being damaged by electrostatic charges in the course of the omissible manual accessing labor. In other words, the computer system-testing apparatus stores configuration data of the corresponding version in each of the EPROM modules 131, 132, and 133, and realizes the FPGA 120 according to data of one module selected from among the EPROM modules 131, 132, and 133. The EPROM module control section 135 generates predetermined selection signals CS1, CS2, and CS3 and selects one module responding to the corresponding selection signals CS1, CS2, and CS3 from among the EPROM modules 131, 132, and 133.

Figure 2:
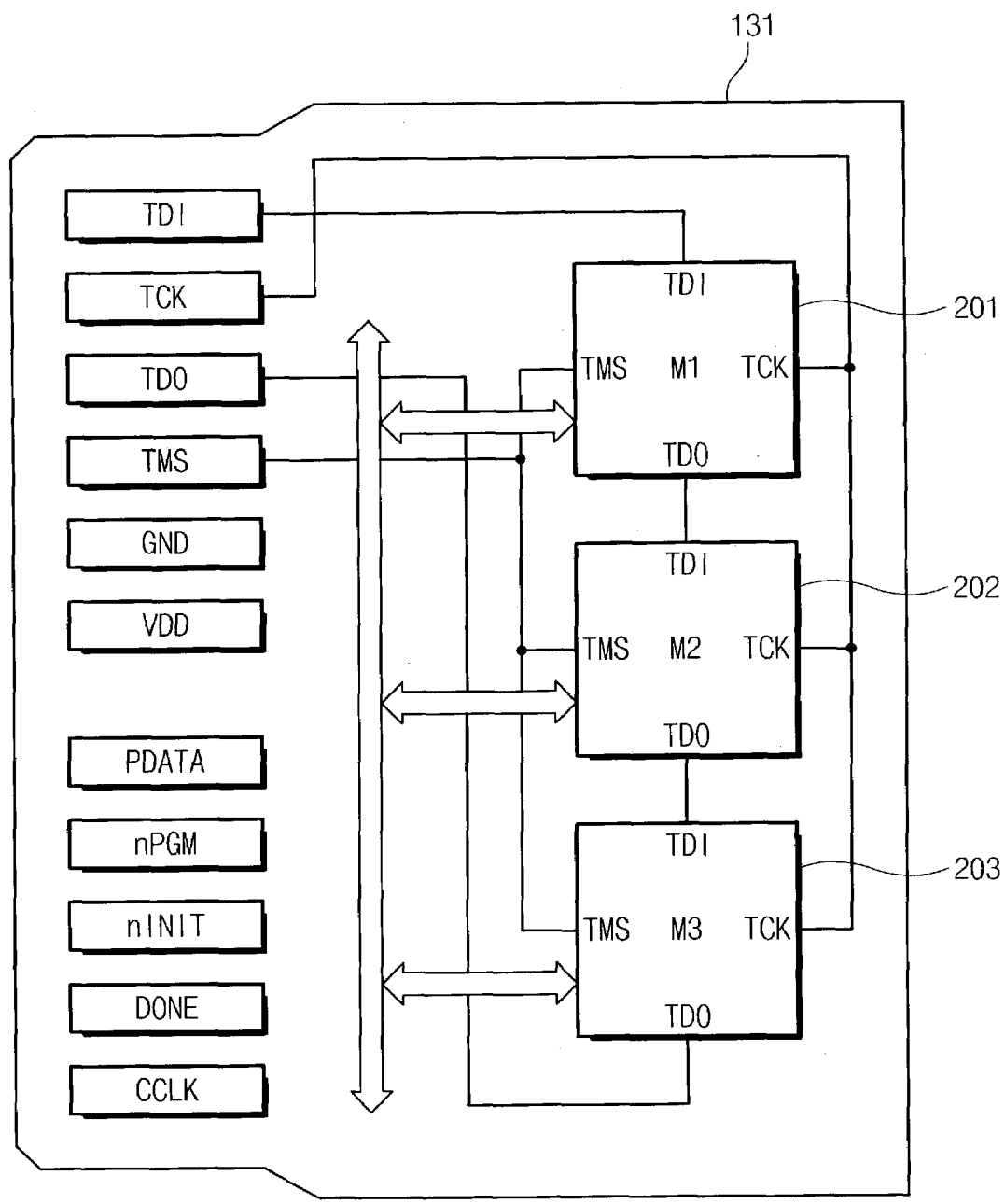
FIG. 2 is a block diagram of the EPROM module shown in FIG. 1.

FIG. 2 is a block diagram of one EPROM module 131. In the EPROM module 131, a plurality of EPROM chips 201, 202, and 203 are connected with the above-mentioned FPGA 120 through module pins TDI, TCK, TDO, TMS, GND, VDD, PDATA, nPGM, nINIT, DONE, and CCLK. The names of module pins TDI, TCK, TDO, TMS, GND, VDD, PDATA, nPGM, nINIT, DONE, and CCLK signify signals standardized by JTEG (Joint Technology Exchange Group) and are used in accessing the EPROM chips 201, 202, and 203 or programming the FPGA 120.

Figure 3:
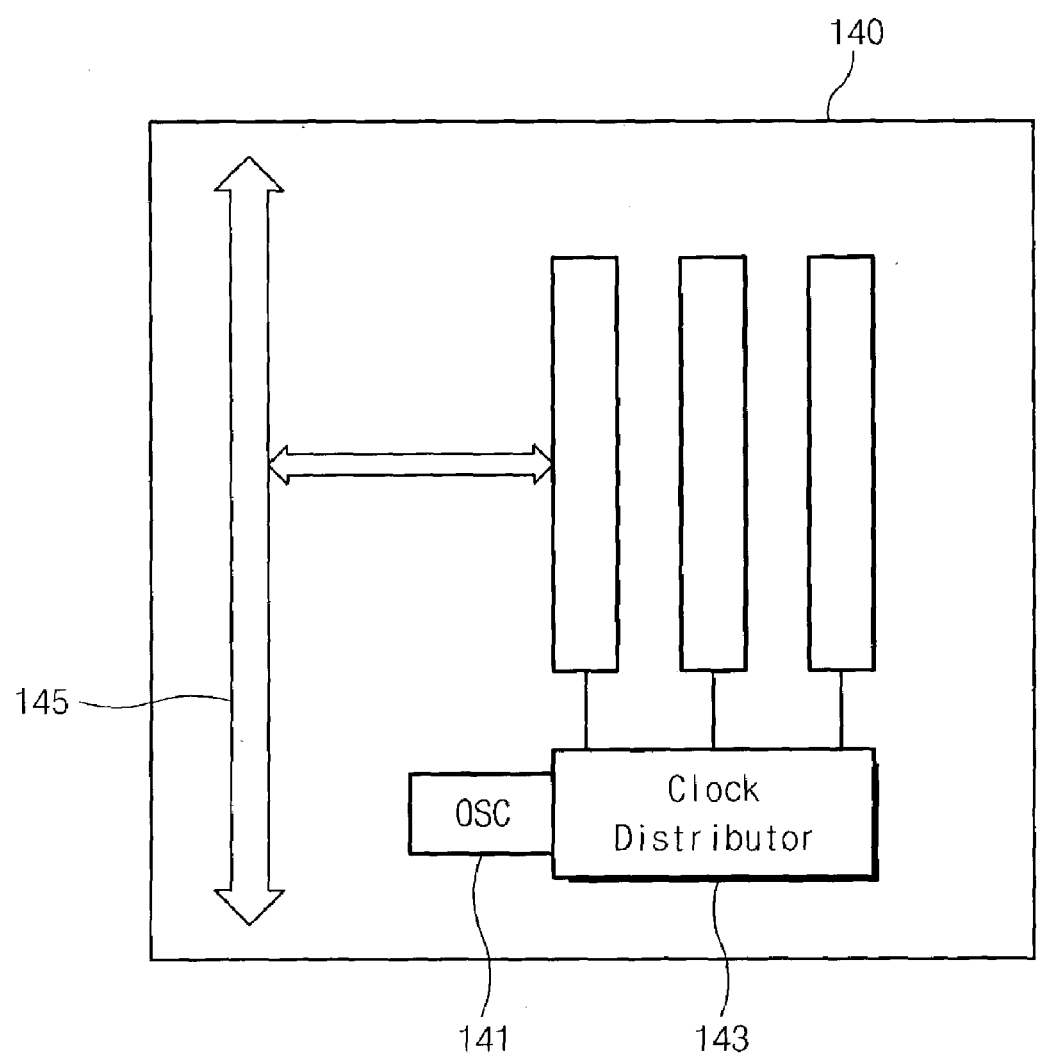
FIG. 3 is a view showing the PCI slot shown in FIG. 1.

FIG. 3 is a view showing the PCI slot 140. The PCI slot 140 is synchronized with clock signals provided by an oscillator (OSC) 141 and a clock distributor 143. An audio adaptor card, a graphic adaptor card, a Local Area Network (LAN) interface card, a Small Computer System Interface (SCSI) card, and a PCI-ISA expansion card are inserted in the PCI slot 140. The audio adaptor card controls an audio output through a speaker, and the graphic adaptor card controls a video output through a display monitor. The LAN interface card connects the computer system with a local area network. The SCSI card controls a CD-ROM drive, a scanner or a high-speed SCSI disc drive. The PCI-ISA expansion card connects a keyboard, microphone, and mouse connected to an ISA bus with the PCI bus 145. The peripheral devices connected with the PCI slot 140 are connected to the controller 110 through the PCI host controller 121 and the system bus 115 by the PCI host controller 121 in the FPGA 120 as shown in FIG. 1.

Figure 4:
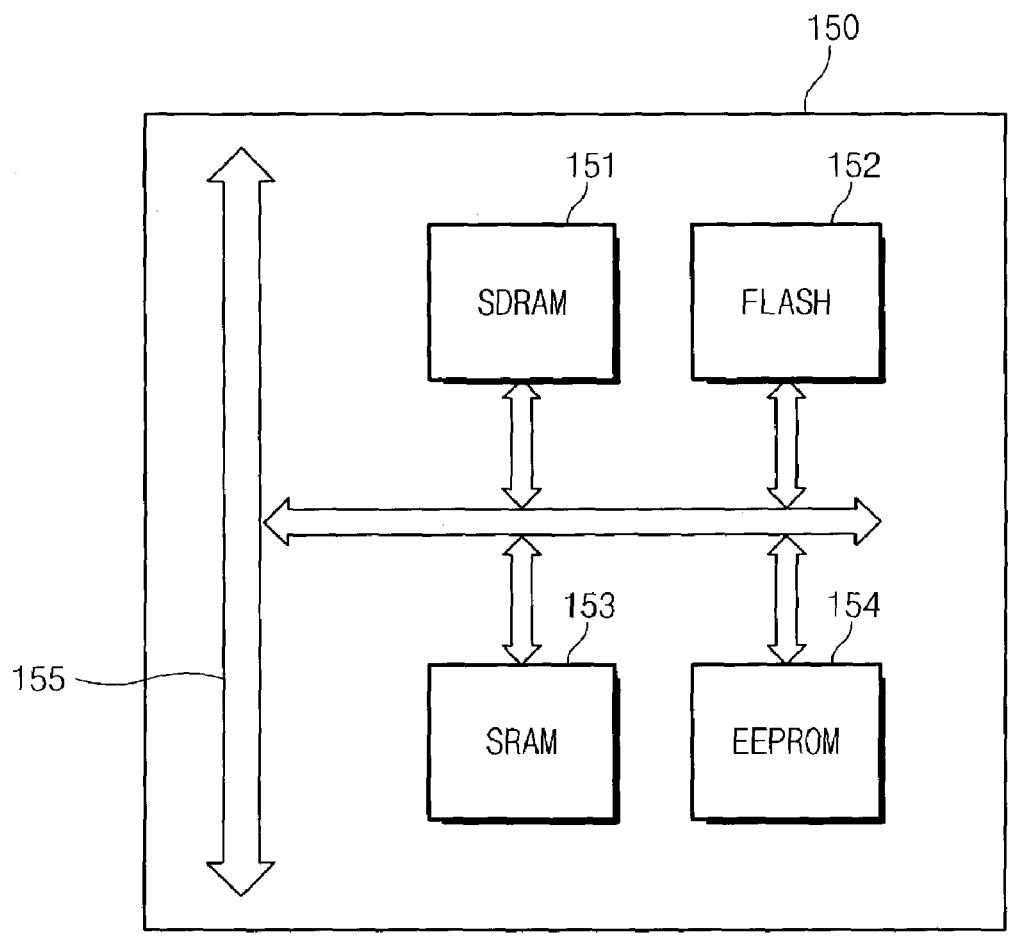
FIG. 4 is a view showing the memory interface card shown in FIG. 1.

FIG. 4 is a view showing the memory interface card 150. Memories used in performing functions of the computer system, such as a system memory, a buffer memory, a cache memory, and a graphic memory, are connected with the memory interface card 150. As examples of such memories, there can be enumerated a ROM (not shown), an SDRAM 151, a flash memory 152, an SRAM 153, and an EEPROM 154. These memories are connected with the controller 110 through a memory interface bus 155 and the system bus 115 by memory controller 122 in the FPGA 120.

Referring again to FIG. 1, the system clock circuit 160 generates clock signals used in the computer system, and the clock signals are synchronized with each other by the PLL 123 in the FPGA 120, thereby synchronizing the computer system. The first UART section 170 controls serial data transmission of a modem, printer, or other serial devices, that is, RS-232C mode transmission. RS-232C mode is a transmission mode well-known to those skilled in the art, which utilizes a 9-pin or 25-pin port. The reset circuit 180 is connected with the controller 110 and the FPGA 120, so as to reset the controller 110 and the FPGA 120 according to a reset operation of the computer system.

Therefore, in the computer system-testing apparatus according to an embodiment of the present invention, the FPGA 120 has an increased programmable area since the FPGA 120 does not contain a bus bridge circuit, in comparison with the conventional FPGA. Further, in contrast to the conventional FPGA (in which several input and output pins are used in connecting the bus bridge circuit with the external bus, thereby reducing the number of available pins for connection of the peripheral devices), even peripheral devices requiring many input and output ports can be easily connected with the FPGA 120 in the computer system-testing apparatus according to the present invention.

Figure 5:
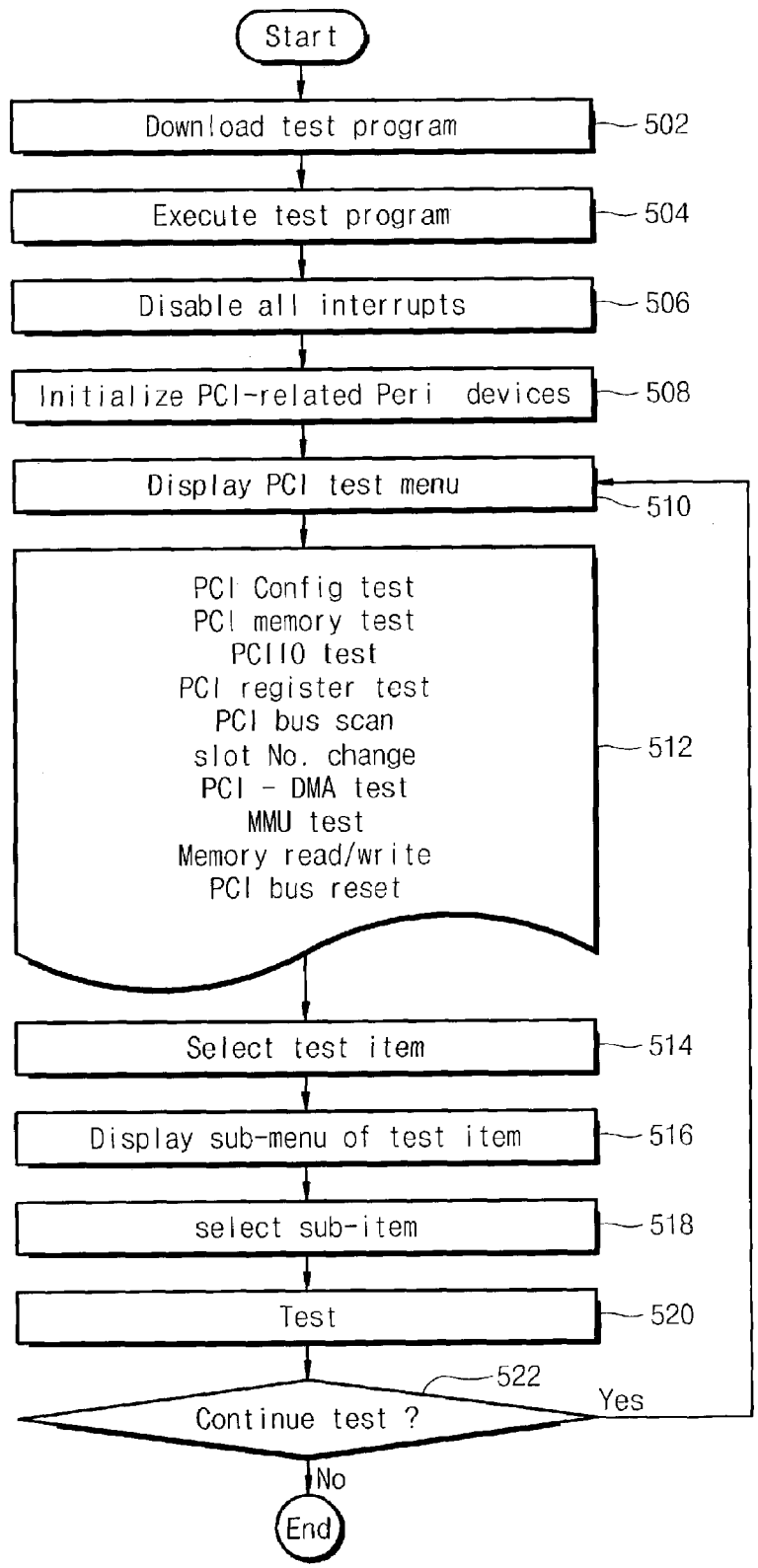
FIG. 5 is a flowchart of a method for testing a computer system according to an embodiment of the present invention, which utilizes the computer system-testing apparatus shown in FIG. 1.

FIG. 5 is a flowchart of a method for testing a computer system according to an embodiment of the present invention, which utilizes the computer system-testing apparatus shown in FIG. 1. First, the FPGA 120 in the computer system-testing apparatus has been programmed in accordance with the configurations of the computer peripheral devices stored in one EPROM module selected from among the EPROM modules 131, 132, and 133. The method for testing a computer utilizing the computer system-testing apparatus includes first to ninth steps. In the first step (step 502), a predetermined test program is downloaded. The test program may have various constructions according to a user's necessities. In the second step (step 504), the test program downloaded in the first step is executed. In the third step (step 506), all interrupts in the computer system-testing apparatus are disabled. In the fourth step (step 508), PCI-related peripheral devices are initialized.

Thereafter, in the fifth step (step 510), a PCI test menu is displayed. The PCI test menu (step 512) includes items of PCI configuration test, PCI memory test, PCI IO test, PCI register test, PCI bus scan, slot number change, PCI-DMA test, MMU test, Memory Read, Memory Write, PCI bus reset, and the like. In the sixth step (step 514), an item is selected from among the items of the menu displayed in the fifth step. In the seventh step (step 516), a sub-menu in the selected test item is displayed. In the eighth step (step 518), a sub-item is selected from among sub-items in the sub-menu. In the ninth step (step 520), a test of the computer system by the computer system-testing apparatus is executed. Thereafter, according to whether the above-mentioned test should be continued or not (step 522), the process goes to the fifth step (step 510) or the test is ended.

As described above, in an apparatus for testing a computer system according to the present invention, the FPGA does not contain a bus bridge circuit, so that the FPGA has an increased programmable area in comparison with the conventional FPGA. Further, in contrast to the conventional FPGA (in which several input and output pins are exclusively used by the bus bridge circuit, thereby reducing the number of available pins for connection of the peripheral devices), even peripheral devices requiring many input and output ports can be easily connected with the FPGA in the apparatus for testing a computer system according to the present invention.

In addition, an apparatus for testing a computer system according to the present invention includes a plurality of EPROM modules storing configuration data of peripheral devices in different versions. As a result, when functions of the peripheral devices are adjusted or extended, manual accessing labor for replacing an EPROM module is unnecessary, so that time required in testing the computer system can be reduced.

Although the preferred embodiments of the present invention have been disclosed for illustrative purposes, those skilled in the art will appreciate that various modifications, additions and substitutions are possible, without departing from the scope and spirit of the invention as described in the accompanying claims

What is claimed is:

1. An apparatus for testing a computer system, comprising:
    a controller having a function of testing the computer system;
    a plurality of programmable memory modules, each of which stores Field Programmable Gate Array (FPGA) element configuration data for programming FPGA elements for emulating functions of peripheral devices of the computer system; and
    an FPGA programmed according to the FPGA element configuration data stored in one memory module selected from among the plurality of programmable memory modules for emulating functions of correspondingly selected peripheral devices during a test.

2. The apparatus for testing a computer system as claimed in claim 1, wherein the memory modules store the FPGA element configuration data of the peripheral devices in corresponding versions, respectively, the versions being differentiated according to functions of the computer system.

3. The apparatus for testing a computer system as claimed in claim 1, wherein each of the memory modules stores FPGA element configuration data about a Peripheral Component Interconnect (PCI) host controller, a memory controller, a Phase Lock Loop (PLL), an interrupt controller, an arbiter, a Universal Asynchronous Receiver/Transmitter (UART), or a timer.

4. The apparatus for testing a computer system as claimed in claim 1, further comprising a memory module control section for selecting one memory module from among the plurality of programmable memory modules.

5. The apparatus for testing a computer system as claimed in claim 1, further comprising a slot for accepting a function card connected with the peripheral devices.

6. The apparatus for testing a computer system as claimed in claim 5, wherein the function card is an audio adaptor card, a graphic adaptor card, a Local Area Network (LAN) interface card, a Small Computer System Interface (SCSI) card, or a PCI-ISA expansion card.

7. The apparatus for testing a computer system as claimed in claim 1, further comprising a memory interface card for interfacing with a memory used in performing functions of the computer system.

8. The apparatus for testing a computer system as claimed in claim 7, wherein the memory is a system memory, a buffer memory, a cache memory, or a graphic memory.

9. A method for testing a computer system by means of an apparatus comprising a plurality of programmable memory modules and a Field Programmable Gate Array (FPGA), each of the programmable memory modules storing FPGA element configuration data for programming FPGA elements for emulating functions of selected peripheral devices of the computer system in different versions, the FPGA being programmed according to FPGA element configuration data stored in one memory module correspondingly selected from among the plurality of programmable memory modules, the method comprising the steps of:
  downloading a predetermined test program;
  executing the test program;
  initializing PCI-related peripheral devices connected to the computer system;
  selecting a test item from a PCI test menu of the test program; and
  executing a test of the computer system in relation to the test item.

10. The method for testing a computer system as claimed in claim 9, further comprising the step of disabling all interrupts in the computer system.

11. The method for testing a computer system as claimed in claim 9, wherein the selecting a test item step further comprises:
  displaying a sub-menu of items relating to the selected test items; and
  selecting a sub-item from the sub-menu.

12. The method for testing a computer system as claimed in claim 9, wherein the memory modules store the FPGA element configuration data of peripheral devices in corresponding versions, respectively, the versions being differentiated according to functions of the computer system.

13. The method for testing a computer system as claimed in claim 9, wherein each of the memory modules stores FPGA element configuration data about a Peripheral Component Interconnect (PCI) host controller, a memory controller, a Phase Lock Loop (PLL), an interrupt controller, an arbiter, a Universal Asynchronous Receiver/Transmitter (UART), or a timer.

14. The method for testing a computer system as claimed in claim 9, wherein the apparatus further comprises a memory module control section for selecting one memory module from among the plurality of programmable memory modules.

15. The method for testing a computer system as claimed in claim 9, wherein the apparatus further comprises a slot for accepting a function card connected with the peripheral devices.

16. The method for testing a computer system as claimed in claim 9, wherein the apparatus further comprises a memory interface card for interfacing with a memory used in performing functions of the computer system.

* * * * *